(12) United States Patent
Blankenship et al.

(10) Patent No.: US 10,405,322 B2
(45) Date of Patent: Sep. 3, 2019

(54) PHYSICAL RESOURCE BLOCK ALLOCATION

(71) Applicant: TELEFONAKTIEBOLAGET LM ERICSSON (PUBL), Stockholm (SE)

(72) Inventors: Yufei Blankenship, Kildeer, IL (US); Johan Bergman, Stockholm (SE); Asbjörn Grövlen, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/738,471

(22) PCT Filed: Jun. 24, 2016

(86) PCT No.: PCT/IB2016/053776
§ 371 (c)(1),
(2) Date: Dec. 20, 2017

(87) PCT Pub. No.: WO2016/207848
PCT Pub. Date: Dec. 29, 2016

(65) Prior Publication Data
US 2018/0184434 A1    Jun. 28, 2018

Related U.S. Application Data

(60) Provisional application No. 62/184,140, filed on Jun. 24, 2015.

(51) Int. Cl.
*H04W 72/08* (2009.01)
*H04L 1/18* (2006.01)
(Continued)

(52) U.S. Cl.
CPC ........... *H04W 72/082* (2013.01); *H04L 1/189* (2013.01); *H04L 1/1812* (2013.01);
(Continued)

(58) Field of Classification Search
CPC ... H04L 1/1812; H04L 1/1845; H04L 1/1858; H04L 1/1889; H04W 4/70; H04W 72/042; H04W 72/082; H04W 72/14
See application file for complete search history.

(56) References Cited

U.S. PATENT DOCUMENTS

| | | | | |
|---|---|---|---|---|
| 2015/0245323 | A1* | 8/2015 | You | H04W 72/042 370/329 |
| 2016/0105264 | A1* | 4/2016 | Chen | H04W 4/70 370/329 |
| 2016/0192333 | A1* | 6/2016 | Wang | H04W 4/70 370/329 |

FOREIGN PATENT DOCUMENTS

| | | |
|---|---|---|
| CN | 103929266 A | 7/2014 |
| CN | 104348580 A | 2/2015 |

(Continued)

OTHER PUBLICATIONS

3GPP TS 36.211 V12.4.0, 3rd Generation Partnership Project; Technical Specification Group Radio Access Network; Evolved Universal Terrestrial Radio Access (E-UTRA); Physical channels and modulation, Dec. 2014.
(Continued)

*Primary Examiner* — Mewale A Ambaye
(74) *Attorney, Agent, or Firm* — Withrow & Terranova, PLLC

(57) ABSTRACT

Systems and methods relating to decoding a downlink channel that utilizes repetitions and, in particular, decoding the downlink channel when the number of repetitions utilized for transmission of the downlink channel is unknown. In some embodiments, a method of operation of a User Equipment device (UE) in a cellular communications network comprises identifying a Signal to Interference plus Noise (SINR) value for a signal received by the UE from a radio access node of the cellular communications network, (Continued)

identifying a number of repetitions estimated to be used for transmission of a downlink channel from the radio access node based on the SINR value, and attempting to decode the downlink channel based on the number of repetitions estimated to be used for transmission of the downlink channel from the radio access node.

20 Claims, 10 Drawing Sheets

(51) Int. Cl.
  *H04L 5/00* (2006.01)
  *H04W 72/04* (2009.01)
  *H04W 4/70* (2018.01)
  *H04W 72/14* (2009.01)
(52) U.S. Cl.
  CPC .......... *H04L 1/1845* (2013.01); *H04L 1/1858* (2013.01); *H04L 5/0053* (2013.01); *H04W 72/042* (2013.01); *H04W 4/70* (2018.02); *H04W 72/14* (2013.01)

(56) References Cited

FOREIGN PATENT DOCUMENTS

| | | |
|---|---|---|
| EP | 2835990 A1 | 2/2015 |
| WO | 2015012653 A1 | 1/2015 |

OTHER PUBLICATIONS

3GPP TS 36.213 V12.4.0, 3rd Generation Partnership Project; Technical Specification Group Radio Access Network; Evolved Universal Terrestrial Radio Access (E-UTRA); Physical layer procedures, Dec. 2014.
3GPP TS 36.331 V12.4.1, 3rd Generation Partnership Project; Technical Specification Group Radio Access Network; Evolved Universal Terrestrial Radio Access (E-UTRA); Radio Resource Control (RRC); Protocol specification, Dec. 2014.
3GPP TR 36.888 v12.0.0, Study on provision of low-cost Machine-Type Communications (MTC) User Equipments (UEs) based on LTE, Jun. 26, 2013.
3GPP Tdoc RP-141660, Work Item Description: Further LTE Physical Layer Enhancements for MTC, Ericsson, Nokia Networks, Scotland, Sep. 12, 2014.
3GPP TS 36.214 V12.2.0, 3rd Generation Partnership Project; Technical Specification Group Radio Access Network; Evolved Universal Terrestrial Radio Access (E-UTRA); Physical layer; Measurements, Mar. 2015.
Mediatek Inc., "R1-152114: Discussion on PUCCH functionality for Rel-13 MTC", 3GPP TSG-RAN WG1 Meeting # 80BIS, Belgrade, RS, Apr. 20-24, 2015, 3GPP, 2 pages.
Mediatek Inc., "R1-152118: Downlink control channel for UL HARQ support," 3GPP TSG-RAN WG1 Meeting #80bis, Belgrade, Serbia, Apr. 20-24, 2015, 3GPP, 5 pages.
NTT DOCOMO, "R1-152053: Remaining issues on PDSCH for low complexity MTC," 3GPP TSG-RAN WG1 Meeting #80bis, Belgrade, Serbia, Apr. 20-24, 2015, 3GPP, 6 pages.
Samsung, "R1-140356: PDCCH Coverage Enhancements for MTC Ues," 3GPP TSG-RAN WG1 #76, Prague, Czech Republic, Feb. 10-14, 2014, 3GPP, 3 pages.
Samsung, "R1-152828: Structure of DL Control Channels for Low Cost Ues," 3GPP TSG RAN WG1 #81, Fukuoka, Japan, May 25-29, 2015, 3GPP, 3 pages.
Sony, "R1-150426: Active RX Time for NC-PDCCH and ePDCCH for MTC," 3GPP TSG-RAN WG1 Meeting #80, Athens, Greece, Feb. 9-13, 2015, 3GPP, 6 pages.
Sony, "R1-150636: Performance of NC-PDCCH and ePDCCH for MTC in Coverage Enhancement Mode," 3GPP TSG-RAN WG1 Meeting #80, Athens, Greece, Feb. 9-13, 2015, 3GPP, 5 pages.
Notification of Reasons for Refusal for Japanese Patent Application No. 2017-566652, dated Sep. 20, 2018, 13 pages.
International Search Report and Written Opinion for International Patent Application No. PCT/IB2016/053776, dated Oct. 19, 2016, 11 pages.

\* cited by examiner

PHYSICAL RESOURCE BLOCK ALLOCATION

RELATED APPLICATIONS

This application is a 371 of PCT/IB2016/053776, filed Jun. 24, 2016, which claims the benefit of provisional patent application Ser. No. 62/184,140, filed Jun. 24, 2015, the disclosure of which is hereby incorporated herein by reference in its entirety.

TECHNICAL FIELD

This disclosure pertains to Physical Resource Block (PRB) allocation, and more particularly, to PRB allocation of physical downlink control and data channels for Machine Type Communication (MTC) operation.

BACKGROUND

Third Generation Partnership Project (3GPP) Long Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval.

Machine Type Communication (MTC)

For MTC, it would be efficient for operators to be able to serve MTC User Equipment devices (UEs) using an already-deployed Radio Access Technology (RAT). Therefore, 3GPP LTE has been investigated as a competitive RAT for efficient support of MTC. Lowering the cost of MTC UEs can facilitate implementation of the concept of the "Internet of Things" (IoT). Many MTC applications will use UEs that demonstrate low operational power consumption that are expected to communicate with infrequent, small burst transmissions. In addition, there is a substantial market for Machine-to-Machine (M2M) use cases of devices deployed deep inside buildings, which would benefit from coverage enhancement in comparison to the defined LTE cell coverage footprint.

3GPP LTE Release (Rel) 12 has defined a UE power saving mode allowing long battery lifetime and a new UE category allowing reduced modem complexity. In Rel-13, further MTC work is expected to further reduce UE cost and provide coverage enhancement. The key element to enable cost reduction is to introduce reduced UE bandwidth of 1.4 Megahertz (MHz) in downlink and uplink within any system bandwidth.

In LTE, the system bandwidth can be up to 20 MHz, and this total bandwidth is divided into Physical Resource Blocks (PRBs). The low-complexity UEs with reduced UE bandwidth of 1.4 MHz that will be introduced in LTE Rel-13 will be able to receive a portion of the total system bandwidth at a time—a part corresponding to up to six PRBs. Here, a group of six PRBs is referred to as a "PRB group."

M-PDCCH

Transmissions on LTE physical data channels (i.e., the Physical Downlink Shared Channel (PDSCH) and the Physical Uplink Shared Channel (PUSCH)) are typically scheduled using Downlink Control Information (DCI) in a PDCCH. For the mentioned low-complexity UEs with reduced bandwidth, the Physical Downlink Control Channel (PDCCH) bandwidth cannot be larger than six PRBs. Here, we refer to the PDCCH supporting low-complexity UEs and enhanced coverage as "M-PDCCH." The M-PDCCH will be based on the existing enhanced PDCCH (E-PDCCH).

The M-PDCCH will also be used for scheduling paging messages carried by the PDSCH. In order to achieve the coverage targeted in LTE Rel-13 for low-complexity UEs and other UEs operating delay tolerant MTC applications, the M-PDCCH needs to have sufficient coverage. This is achieved with repeating the M-PDCCH over several subframes in order to allow energy accumulation at the UE side.

Paging

While in idle mode, UEs listen at periodic paging occasions for paging messages from the network. For MTC, power consumption is critical and, since the typical case is that there is no page for any UE in a paging occasion, it is important to keep the UE's receiver on for as short a period as possible.

SUMMARY

Systems and methods relating to decoding a downlink channel that utilizes repetitions and, in particular, decoding the downlink channel when the number of repetitions utilized for transmission of the downlink channel is unknown. In this regard, embodiments of a method of operation of a User Equipment device (UE) in a cellular communications network are disclosed. In some embodiments, the method of operation of a UE comprises identifying a Signal to Interference plus Noise (SINR) value for a signal received by the UE from a radio access node of the cellular communications network, identifying a number of repetitions estimated to be used for transmission of a downlink channel from the radio access node based on the SINR value, and attempting to decode the downlink channel based on the number of repetitions estimated to be used for transmission of the downlink channel from the radio access node. By estimating the number of repetitions used for transmission of the downlink channel, the UE is able to keep its receiver on for a shorter amount of time as compared to assuming a maximum number of repetitions, thereby saving energy.

In some embodiments, the downlink channel is a physical downlink control channel.

In some embodiments, the UE is a low-complexity UE that receives a limited system bandwidth within a larger system bandwidth of the radio access node, and the downlink channel is a Physical Downlink Control Channel (PDCCH) for low-complexity UEs. Further, in some embodiments, the limited system bandwidth is 1.4 megahertz (MHz). Further, in some embodiments, the PDCCH is a PDCCH utilized to page the UE.

In some embodiments, identifying the number of repetitions estimated to be used for transmission of the downlink channel from the radio access node comprises identifying the number of repetitions estimated to be used for transmission of the downlink channel from the radio access node based on a predefined Look-Up Table (LUT). In some embodiments, the predefined LUT maps Additive White Gaussian Noise (AWGN) SINR values to repetition number values.

In some embodiments, identifying the number of repetitions estimated to be used for transmission of the downlink channel from the radio access node comprises identifying the number of repetitions estimated to be used for transmission of the downlink channel from the radio access node based on a predefined equation.

In some embodiments, the number of repetitions estimated to be used for transmission of the downlink channel from the radio access node may be different than a number of repetitions utilized by the radio access node when transmitting the downlink channel.

In some embodiments, attempting to decode the downlink channel based on the number of repetitions estimated to be used for transmission of the downlink channel from the radio access node comprises accumulating a number of subframes that corresponds to the number of repetitions when attempting to decode the downlink channel.

In some embodiments, attempting to decode the downlink channel based on the number of repetitions estimated to be used for transmission of the downlink channel from the radio access node comprises accumulating a first number of subframes that corresponds to a first hypothesized number of repetitions in a set of hypothesized numbers of repetitions, the set comprising the number of repetitions estimated to be used for transmission of the downlink channel from the radio access node and attempting to decode the downlink channel based on the accumulation of the first number of subframes. Attempting to decode the downlink channel further comprises, if the attempt to decode the downlink channel based on the accumulation of the first number of subframes is unsuccessful, accumulating an additional number of subframes together with the first number of subframes to provide accumulation of a second number of subframes that corresponds to a second hypothesized number of repetitions in the set of hypothesized numbers of repetitions and attempting to decode the downlink channel based on the accumulation of the second number of subframes. In some embodiments, the method further comprises stopping accumulation of subframes and deactivating a respective receiver of the UE upon successfully decoding the downlink channel or upon attempting to decode the downlink channel based on an accumulation of a number of subframes that corresponds to a final number of hypothesized repetitions in the set of hypothesized numbers of repetitions.

Embodiments of a UE for a cellular communications network are also disclosed. In some embodiments, the UE comprises at least one transceiver, at least one processor, and memory storing instructions executable by the at least one processor whereby the UE is operable to identify a SINR value for a signal received by the UE from a radio access node of the cellular communications network, identify a number of repetitions estimated to be used for transmission of a downlink channel from the radio access node based on the SINR value, and attempt to decode the downlink channel based on the number of repetitions estimated to be used for transmission of the downlink channel from the radio access node.

In some embodiments, the downlink channel is a PDCCH.

In some embodiments, the UE is a low-complexity UE that receives a limited system bandwidth within a larger system bandwidth of the radio access node, and the downlink channel is a PDCCH for low-complexity UEs. In some embodiments, the limited system bandwidth is 1.4 MHz. In some embodiments, the PDCCH is a PDCCH utilized to page the UE.

In some embodiments, in order to identify the number of repetitions estimated to be used for transmission of the downlink channel from the radio access node, the UE is further operable to identify the number of repetitions estimated to be used for transmission of the downlink channel from the radio access node based on a predefined LUT. In some embodiments, the predefined LUT maps AWGN SINR values to repetition number values.

In some embodiments, in order to identify the number of repetitions estimated to be used for transmission of the downlink channel from the radio access node, the UE is further operable to identify the number of repetitions estimated to be used for transmission of the downlink channel from the radio access node based on a predefined equation.

In some embodiments, the number of repetitions estimated to be used for transmission of the downlink channel from the radio access node may be different than a number of repetitions utilized by the radio access node when transmitting the downlink channel.

In some embodiments, in order to attempt to decode the downlink channel based on the number of repetitions estimated to be used for transmission of the downlink channel from the radio access node, the UE is further operable to accumulate a number of subframes that corresponds to the number of repetitions when attempting to decode the downlink channel.

In some embodiments, in order to attempt to decode the downlink channel based on the number of repetitions estimated to be used for transmission of the downlink channel from the radio access node, the UE is further operable to accumulate a first number of subframes that corresponds to a first hypothesized number of repetitions in a set of hypothesized numbers of repetitions, the set comprising the number of repetitions estimated to be used for transmission of the downlink channel from the radio access node, and attempt to decode the downlink channel based on the accumulation of the first number of subframes. Further, if the attempt to decode the downlink channel based on the accumulation of the first number of subframes is unsuccessful, the UE is further operable to accumulate an additional number of subframes together with the first number of subframes to provide accumulation of a second number of subframes that corresponds to a second hypothesized number of repetitions in the set of hypothesized numbers of repetitions, and attempt to decode the downlink channel based on the accumulation of the second number of subframes. In some embodiments, the UE is further operable to stop accumulation of subframes and deactivate a respective receiver of the UE upon successfully decoding the downlink channel or upon attempting to decode the downlink channel based on an accumulation of a number of subframes that corresponds to a final number of hypothesized repetitions in the set of hypothesized numbers of repetitions.

In some embodiments, a UE for a cellular communications network is adapted to identify a SINR value for a signal received by the UE from a radio access node of the cellular communications network, identify a number of repetitions estimated to be used for transmission of a downlink channel from the radio access node based on the SINR value, and attempt to decode the downlink channel based on the number of repetitions estimated to be used for transmission of the downlink channel from the radio access node. Further in some embodiments, the UE is further adapted to operate according to the method of operation of UE according to any of the embodiments described herein.

In some embodiments, a UE for a cellular communications network comprises a SINR identifying module operable to identify a SINR value for a signal received by the UE from a radio access node of the cellular communications network, a number of repetitions identifying module operable to identify a number of repetitions estimated to be used for transmission of a downlink channel from the radio access node based on the SINR value, and a decoding module operable to attempt to decode the downlink channel based on the number of repetitions estimated to be used for transmission of the downlink channel from the radio access node.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
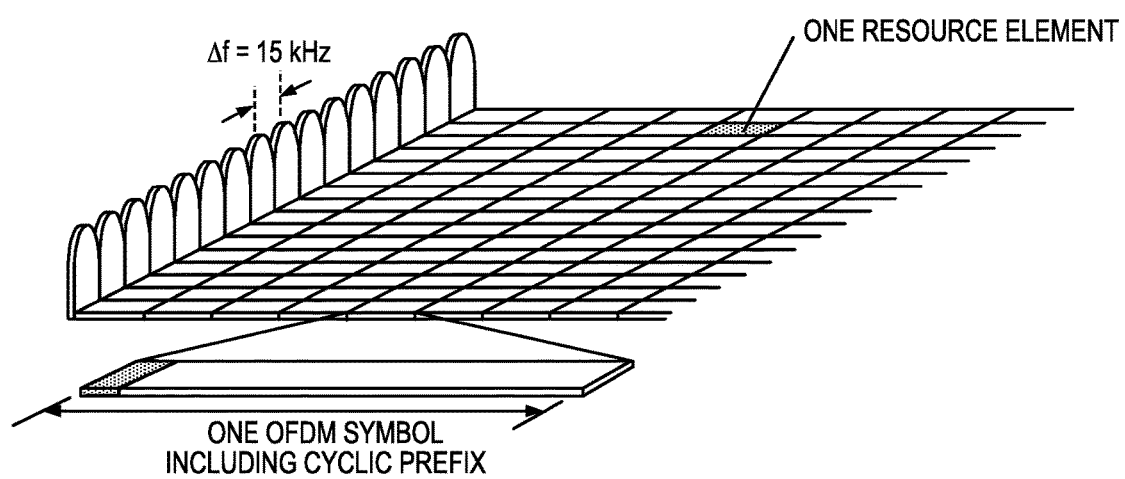
FIG. 1 is a schematic diagram of an example Third Generation Partnership Project (3GPP) Long Term Evolution (LTE) downlink physical resource.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" or "wireless communication device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device (i.e., a MTC UE).

Network Node: As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

As discussed above in the Background, M-PDCCH (i.e., the Physical Downlink Control Channel (PDCCH) supporting low-complexity UEs and enhanced coverage) will be used for scheduling paging messages carried by the Physical Downlink Shared Channel (PDSCH). In order to achieve the coverage targeted in LTE Release (Rel) 13 for low-complexity UEs and other UEs operating delay tolerant MTC applications, the M-PDCCH needs to have sufficient coverage. This is achieved with repeating the M-PDCCH over several subframes in order to allow energy accumulation at the UE side.

Paging transmissions need to reach UEs in the worst coverage situation, which means that a maximum number of repetitions can be quite large. If the eNB always uses the maximum number of repetitions for the M-PDCCH scheduling paging on PDSCH, the UEs need to keep their receivers on for a long time and the resource consumption from paging will be large. Therefore, schemes for adopting the number of repetitions are needed. For the network, it has already been agreed in 3GPP that the MME will provide information to the eNB about the UE's last known coverage enhancements level (e.g., required number of repetitions). The eNB can then start with this level and increase the number of repetitions and, if paging fails, increase the number of repetitions in the next paging occasion. With this scheme, a UE will not be aware of the number of repetitions. In order to avoid accumulating noise, the UE must assume fewer repetitions than what is being used by the network. A way for the UE to estimate the number of repetitions is needed.

According to certain aspects of the embodiments disclosed herein, the UE estimates the number of repetitions that the eNB can use for M-PDCCH in order for the M-PDCCH to be successfully received by the UE from its measured Signal to Interference plus Noise Ratio (SINR). Advantages of the embodiments disclosed herein are readily identifiable to those of ordinary skill in the art. For example, by estimating the SINR and mapping this to a number of repetitions that would need to be used by the eNB for the M-PDCCH in order for the M-PDCCH to be successfully received by the UE, the UE can keep its receiver on for a shorter time in each paging occasion, thereby saving energy.

Figure 2:
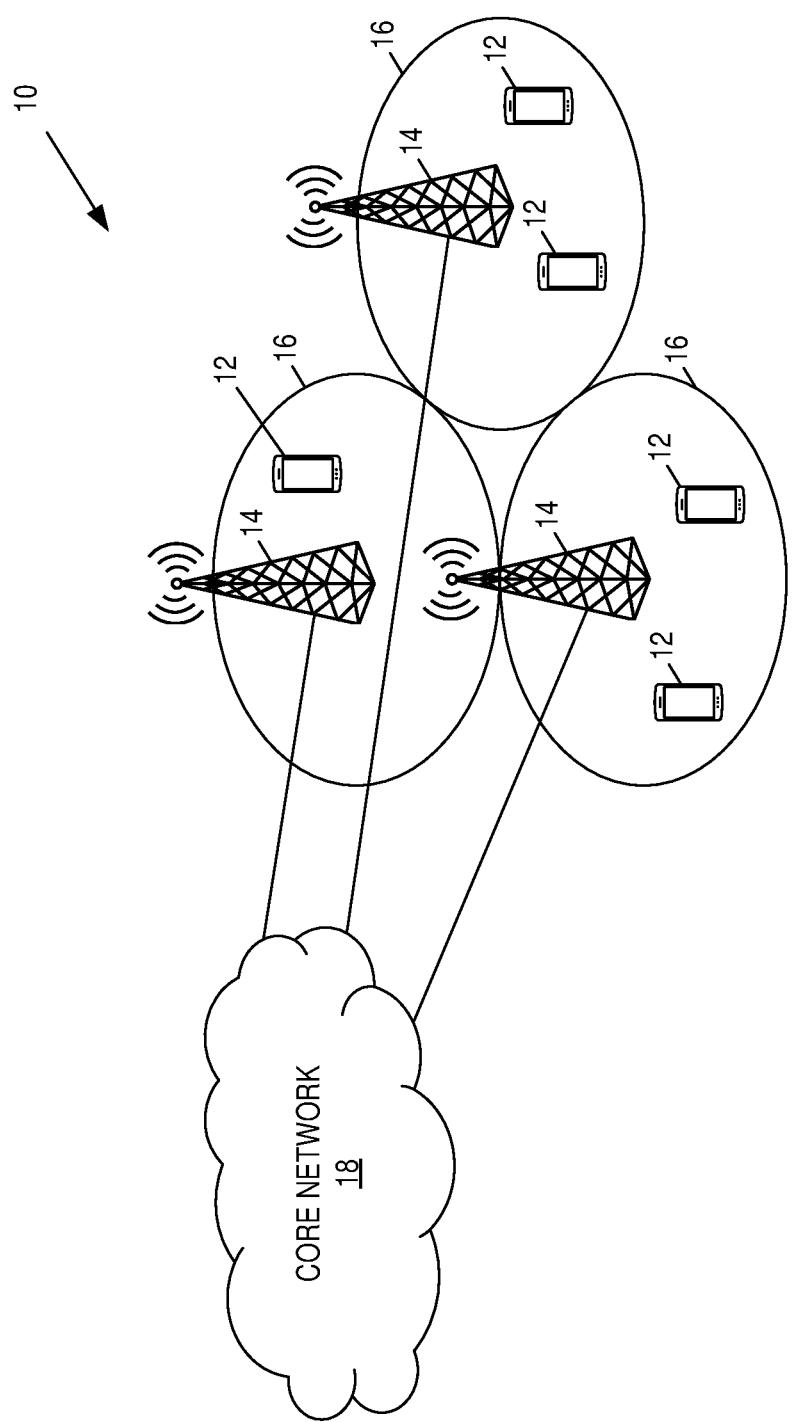
FIG. 2 illustrates one example of a wireless network in which embodiments of the present disclosure may be implemented.

Although the described solutions may be implemented in any appropriate type of wireless network or telecommunication system supporting any suitable communication standards and using any suitable components, particular embodiments of the described solutions may be implemented in an LTE network 10, such as that illustrated in FIG. 2. As shown in FIG. 2, the example network 10 may include one or more instances of wireless communication devices 12 (e.g., conventional UEs, MTC/Machine-to-Machine (M2M) UEs) and one or more radio access nodes 14 (e.g., eNBs or other base stations) capable of communicating with these wireless communication devices 12 along with any additional elements suitable to support communication between wireless communication devices 12 or between a wireless communication device 12 and another communication device (such as a landline telephone). The radio access nodes 14 serve corresponding cells 16 and are connected to a core network 18.

Notably, since many of the example embodiments described herein focus on LTE, the wireless communication devices 12 are sometimes referred to herein as UEs 12 or MTC UEs 12. Likewise, the radio access nodes 14 are sometimes referred to herein as base stations 14 or eNBs 14.

A UE 12 performs channel estimation and measures the SINR for a variety of purposes, such as initial cell attachment, handover, and for monitoring radio link failure. In the following, "SINR" may refer to an existing LTE UE measurement such as the Reference Signal Received Quality (RSRQ) measurement or a potential new LTE UE measurement. For MTC, the SINR can be used to decide the coverage enhancement level for Physical Random Access Channel (PRACH).

For paging transmission, the expectation is that M-PDCCH schedules a PDSCH transmission carrying a Radio Resource Control (RRC) paging message.

To achieve the coverage targeted in LTE Rel-13 for low-complexity UEs and other UEs operating delay-tolerant MTC applications, time repetition techniques may be used. Time repetition techniques facilitate energy accumulation of the received signals at the UE side. For physical data channels (PDSCH, Physical Uplink Shared Channel (PUSCH)), subframe bundling (a.k.a. Transmission Time Interval (TTI) bundling) can be used. When subframe bundling is applied, each Hybrid Automatic Repeat Request (HARQ) (re)transmission consists of a bundle of multiple subframes instead of just a single subframe. Repetition over multiple subframes can also be applied to physical control channels. Depending on a UE's coverage situation, different number of repetitions can be used.

At the outset, as used herein, the term "repetitions" means the number of times a block of information bits is repeated by the base station 14 across subframes, i.e., from the perspective of transmitter. The application also uses the term accumulation to mean the accumulation of subframes at the UE 12 for detecting the block of information bits, i.e., from the perspective of the receiver. But the two terms, repetition and accumulation, are related conceptually, in that the UE 12 can accumulate all or a subset of the repetitions associated with a block of information bits in order to detect it.

Note that, as used herein, "repetition" refers to repeated downlink transmission of a given block of information bits; it is not intended to limit to simple repetition and it can refer to other formats of sending the same block of information bits, for example, sending different set of code bits associated with the same block information bits. This does not refer to the potential repeated paging attempts at different paging occasions defined in LTE Rel-8. Further the repetition may or may not account for the downlink subframes not available for M-PDCCH transmission. For example, due to Multimedia Broadcast/Multicast Services (MBMS) subframe or Time Division Duplexing (TDD) configuration, certain subframes are known to be unavailable for M-PDCCH transmission. In one alternative, the number of repetitions is defined to account for the known unavailable subframes so that the number of repetitions refers to subframes with actual downlink control or data transmission. In another alternative, the number of repetitions is nominal, defined to refer to subframes numbering, and does not account for unavailable subframes, in which case the actual number of M-PDCCH repetitions may be fewer than the nominal number of repetitions.

In some embodiments, for finding the number of repetitions to be used for M-PDCCH, the UE 12 keeps a Look-Up Table (LUT) for the number of repetitions it will need for decoding the M-PDCCH successfully for a given SINR. After estimating the SINR, the UE 12 uses the LUT to determine a number of subframes to accumulate when attempting to decode the M-PDCCH. If the UE 12 receives the M-PDCCH after an attempt, the UE 12 may stop accumulating M-PDCCH repetitions for detection.

The UE 12 can identify a value for SINR by, e.g., measuring SINR or using a most recent SINR report. The LUT can be stored locally on the UE 12 or remotely. In some embodiments, the LUT is predefined, e.g., in a specification.

In Table 1 below, a table for looking-up the estimated number of M-PDCCH repetitions is shown for illustration purposes. In this table, the UE 12 uses the estimated equivalent Additive White Gaussian Noise (AWGN) SINR difference to look up the estimated number of M-PDCCH repetitions. The equivalent AWGN SINR difference provides the information on how much worse the channel condition the UE 12 observes is as compared to the normal cell edge. If the SINR difference is 0 or positive, the UE 12 can assume that it is in normal coverage of the base station 14 deployment and no repetition (i.e., a single M-PDCCH transmission) is necessary. Furthermore, in Table 1, it is shown that the maximum number of M-PDCCH repetitions the base station 14 transmits, as associated with a paging occasion, is 32.

TABLE 1

Estimated number of M-PDCCH repetitions when UE attempts to receive M-PDCCH associated with PDSCH carrying paging message

| Index | Equivalent AWGN SINR difference (dB) | Estimated number of M-PDCCH repetitions |
| --- | --- | --- |
| 0 | −2 | 2 |
| 1 | −4 | 3 |
| 2 | −6 | 4 |
| 3 | −8 | 6 |
| 4 | −10 | 9 |
| 5 | −12 | 16 |
| 6 | −14 | 20 |
| 7 | <−14 | 32 |

The UE 12 can also transmit SINR to a network node, and the network node can determine a number of repetitions for the physical control channel using a LUT based on the received SINR. The LUT can be stored locally at a base station site or can be stored remotely. In other words, rather than storing the LUT locally at the UE 12, the LUT may be stored remotely at some network node (e.g., the base station 14 or some other network node), and the UE 12 may utilize its identified SINR to query the network node for the appropriate number of repetitions, which the remote network node obtains from the LUT and returns to the UE 12.

In another embodiment, the number of repetitions for M-PDCCH is determined from an equation or expression mapping a SINR estimate to a number of repetitions. The base station 14 can determine the number of repetitions based on measured SINR or based on reported SINR from the UE 12. In some embodiments, the number of repetitions can be calculated by the UE 12 using SINR (measured, reported, stored, etc.) and the number of repetitions for M-PDCCH can be reported to the base station 14.

It is important that the mapping from SINR to number of repetitions is fairly accurate since, if the UE 12 underestimates the required number of repetitions, the UE 12 may not be able to decode the M-PDCCH with the desired quality (e.g., with the desired block error probability). If the UE 12 overestimates the required number of repetitions, the UE 12 may waste energy (battery).

Figure 3:
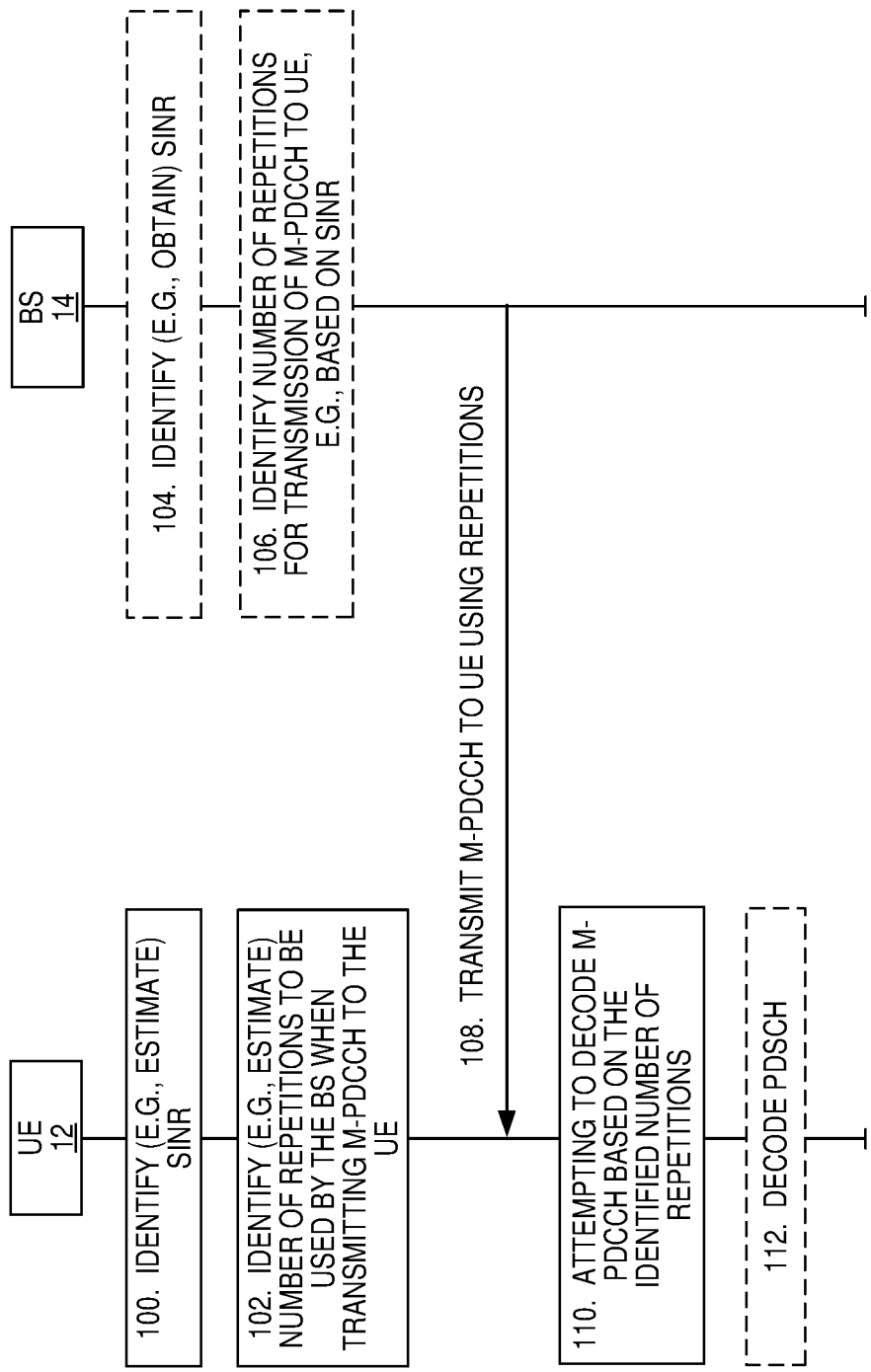
FIG. 3 illustrates the operation of a User Equipment device (UE) and a base station according to some embodiments of the present disclosure.

FIG. 3 illustrates the operation of a UE 12 and a base station 14 according to embodiments of the present disclosure (e.g., according to at least some of the embodiments described in the paragraphs above). Optional steps are indicated by dashed lines. As illustrated, the UE 12 identifies a SINR for the downlink from the base station 14 to the UE 12 (step 100). The UE 12 may identify the SINR by measuring the SINR or by obtaining the SINR, e.g., from a most recent SINR report. The UE 12 identifies a number of repetitions (expected) to be used by the base station 14 when transmitting M-PDCCH to the UE based on the identified SINR (step 102). As described above, the UE 12 may utilize the SINR to obtain the number of repetitions from a LUT, which may be stored locally at the UE 12 or remotely at a network node. In other embodiments, the UE 12 calculates the number of repetition as a function of the SINR using a predefined equation(s).

The base station 14 may identify a SINR for the downlink to the UE 12 (step 104). The base station 14 identifies a number of repetitions for transmission of M-PDCCH to the UE 12 (step 106). The base station 14 may identify the number of repetitions to use based on the SINR. In some other embodiments, the base station 14 may obtain information from another network node (e.g., a MME) about a last known coverage enhancement level of the UE 12, which may include a last known required number of repetitions for the UE 12. The base station 14 may then identify this last known required number of repetitions for the UE 12 as the number of repetitions to be used, at least initially, for transmitting M-PDCCH to the UE 12.

The base station 14 transmits a M-PDCCH to the UE using repetitions (step 108). In some embodiments, the number of repetitions used by the base station 14 when transmitting the M-PDCCH to the UE 12 is the number of repetitions identified by the base station 14 based on the SINR or from information obtained from another network node, as described above. The UE 12 attempts to decode the M-PDCCH transmission based on the number of repetitions identified by the UE 12 in step 102 (step 110). For example, if the UE 12 identifies the number of repetitions in step 102 as being a number N of repetitions, then the UE 12 accumulates, in some embodiments, N subframes and attempts to decode the M-PDCCH transmission using the results of the accumulation. However, as discussed below, in some other embodiments, the UE 12 may attempt to decode the M-PDCCH transmission using less than N repetitions and/or using more than N repetitions (e.g., up to N+M, where M is some predefined number). If the UE 12 is able to successfully decode the M-PDCCH transmission, the UE 12 then uses the information in the M-PDCCH transmission to decode a respective PDSCH transmission (e.g., a RRC paging message) (step 112).

Figure 4:
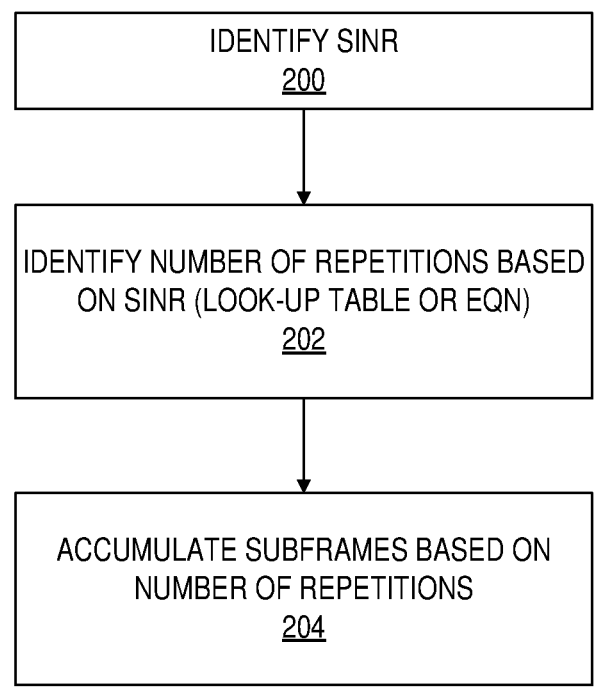
FIG. 4 is a flow chart that illustrates the operation of a UE to determine a number of repetitions based on Signal to Interference plus Noise Ratio (SINR) in accordance with some embodiments of the present disclosure.

FIG. 4 is a flow chart that illustrates the operation of a UE 12 according to some embodiments of the present disclosure. As illustrated, the UE 12 identifies a SINR for the downlink channel from the base station 14 to the UE 12 (step 200). Based on the identified SINR, the UE 12 identifies a number of repetitions (expected) to be used for the M-PDCCH (step 202). The UE 12 then accumulates subframes based on the identified number of repetitions and attempts to decode the M-PDCCH based on the results of the accumulation (step 204).

Figure 5:
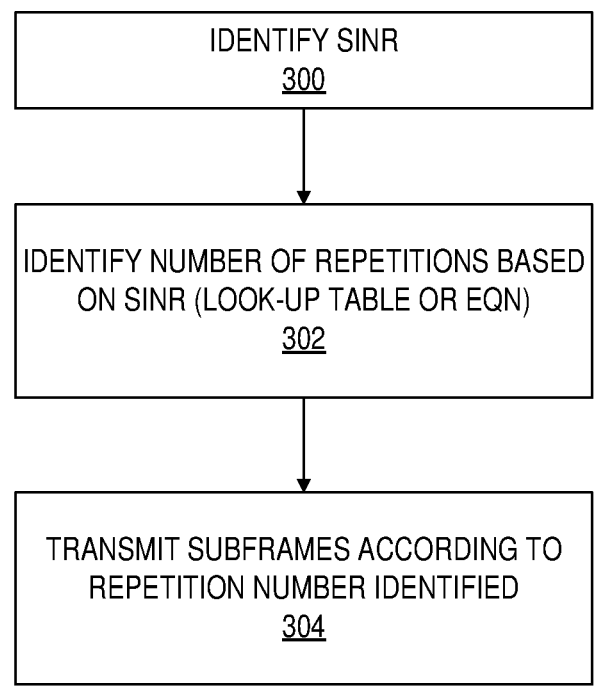
FIG. 5 is a flow chart that illustrates the operation of a base station to determine a number of repetitions based on SINR in accordance with some embodiments of the present disclosure.

FIG. 5 is a flow chart that illustrates the operation of a base station 14 according to some embodiments of the present disclosure. As illustrated, the base station 14 identifies a SINR for the downlink channel from the base station 14 to the UE 12 (step 300). Based on the identified SINR, the base station 14 identifies a number of repetitions (expected) to be used for the M-PDCCH (step 302). The base station 14 then transmits subframes according to the identified number of repetitions (step 304). In other words, the base station 14 transmits M-PDCCH to the UE 12 using the identified number of repetitions.

It should be noted that the number of subframes the UE 12 accumulates before decoding M-PDCCH may or may not be the same as the actual number of repetitions the base station 14 performs when sending M-PDCCH.

Thus, to provide robustness and flexibility in M-PDCCH detection, multiple hypotheses can be used by the UE 12 in one M-PDCCH occasion, where the UE 12 can try a sequence of hypotheses to account for the ambiguity of both (a) in SINR detection within the UE 12 and (b) actual number of M-PDCCH repetitions transmitted by the base station 14. For example, if the UE 12 fails to receive the M-PDCCH after a p-th attempt p with $N_p$ number of M-PDCCH repetitions, the UE 12 can accumulate more M-PDCCH repetitions and make a (p+1)-th attempt with $N_{p+1}$ M-PDCCH repetitions. This covers the case where the base station 14 has sent an M-PDCCH but the UE 12 could not detect with $N_p$ repetitions due to poor channel conditions, but the UE 12 could detect with $N_{p+1}$ repetitions. The UE 12 may accumulate up to the maximum possible number of repetitions of the M-PDCCH before it aborts the M-PDCCH detection for this paging occasion. If the UE 12 cannot detect the M-PDCCH after the maximum possible number of repetitions, the UE 12 then assumes that the base station 14 did not send a paging message for this paging occasion. The minimum set of hypotheses that the UE 12 should try receiving M-PDCCH associated with paging reception can be defined.

In the extreme case, the UE 12 can use the maximum number of hypotheses, where the UE 12 tries decoding the M-PDCCH after every subframe. This method allows the UE 12 to switch its receiver off in order to save power during the time between successfully decoding the M-PDCCH and the start of the PDSCH carrying the paging message. Alternatively, the set of hypotheses can be reduced to compromise between the number of decoding attempts and the amount of switch-off time. For example, if the UE 12 has knowledge of the M-PDCCH repetition factors that the base station 14 may use, e.g. {1, 2, 4, 8, 16}, then the UE 12 may choose to try decoding the M-PDCCH after {1, 2, 4, 8, 16} accumulations.

Figure 6:
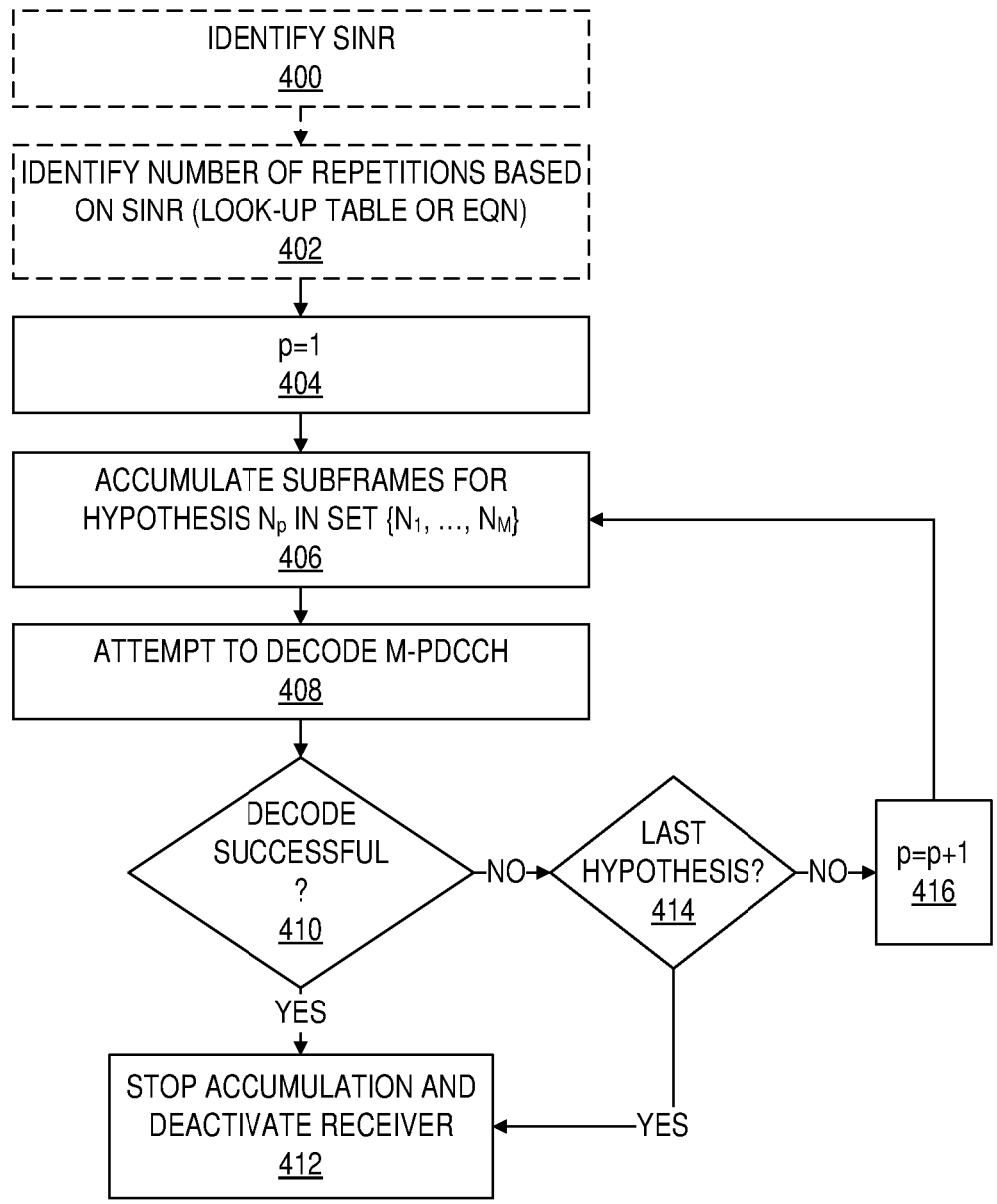
FIG. 6 is a flow chart that illustrates the operation of a UE according to some embodiments of the present disclosure.

FIG. 6 is a flow chart that illustrates the operation of the UE 12 to perform decoding for a set of hypotheses for the number of repetitions according to some embodiments of the present disclosure. Again, optional steps are illustrated with dashed lines. Optionally, the UE 12 identifies a SINR for the downlink from the base station 14 to the UE 12 (step 400) and identifies a number of (expected) repetitions for M-PDCCH based on the identified SINR (step 402), as described above.

In this example, the set of hypotheses is denoted $\{N_1, N_2, \ldots, N_M\}$, where $N_1$ is the first hypothesis of the number of repetitions, $N_2$ is the second hypothesis of the number of repetitions, etc., $N_1 < N_2 < \ldots < N_M$, and M is the number of hypotheses in the set. In some embodiments, the last hypothesis $N_M$ is the number of repetitions identified based on the SINR in step 402. In some other embodiments, the last hypothesis $N_M$ is greater than the number of repetitions identified based on SINR but, e.g., less than a maximum number of repetitions that could be used by the base station 14 when transmitting M-PDCCH. As an example, if the set of repetitions that could be used by the base station 14 when transmitting M-PDCCH is {1, 2, 4, 8, 16, 32, 64} and the number of repetitions identified based on the SINR is 8, then the set of hypothesis may be, for example, {1, 2, 4, 8} or, as another example, {1, 2, 4, 8, 16}.

A hypothesis index p is first set to a value of 1 (step 404). The UE 12 accumulates subframes for hypothesis $N_p$ in the set $\{N_1, N_2, \ldots, N_M\}$ (step 406) and attempts to decode M-PDCCH based on the accumulated subframes (step 408). The UE 12 determines whether the decode attempt was successful (step 410). If so, the UE 12 stops accumulation of subframes and deactivates its receiver (step 412). However, if the decode attempt was not successful, the UE 12 determines whether it has reached the last hypothesis $N_M$ in the set (step 414). If not, the UE 12 increments the hypothesis index p (step 416), and the process returns to step 406. In the second iteration, the accumulation of subframes continues until subframes for $N_2$ repetitions have been accumulated. This includes the subframes for the $N_1$ repetitions that have already been accumulated. The UE 12 then attempts to decode M-PDCCH based on the accumulated subframes for $N_2$ repetitions. The process continues until either the UE 12 successfully decodes M-PDCCH or the UE 12 has reached the last hypothesis $N_M$.

Since the UE 12 will not know the actual number of repetitions used by the base station 12, the starting point of the PDSCH cannot depend on the number of repetitions used in decoding M-PDCCH. The starting point (i.e., starting subframe of M-PDCCH repetitions) and the maximum number of M-PDCCH repetitions should then be a known value to the UE 12, e.g. the maximum number of repetitions that will be used for the M-PDCCH. These parameters could either be signalled in the system information broadcast in the cell 16, or predefined in the specifications for each coverage enhancement level. Furthermore, the maximum possible number of repetitions can be defined as a function of one or multiple of the following parameters:

The maximum level of coverage enhancement the cell 16 supports;

The type(s) of MTC UEs the cell 16 supports, e.g., (1) normal-complexity UEs only; (2) both normal-complexity UEs and low-complexity UEs;

The maximum transmit power level of the base station antenna port(s); and/or

The lowest number of receive antennas the UE 12 can have for proper function within the cell 16.

Other parameters may also be considered in defining the maximum number of M-PDCCH repetitions.

Figure 7:
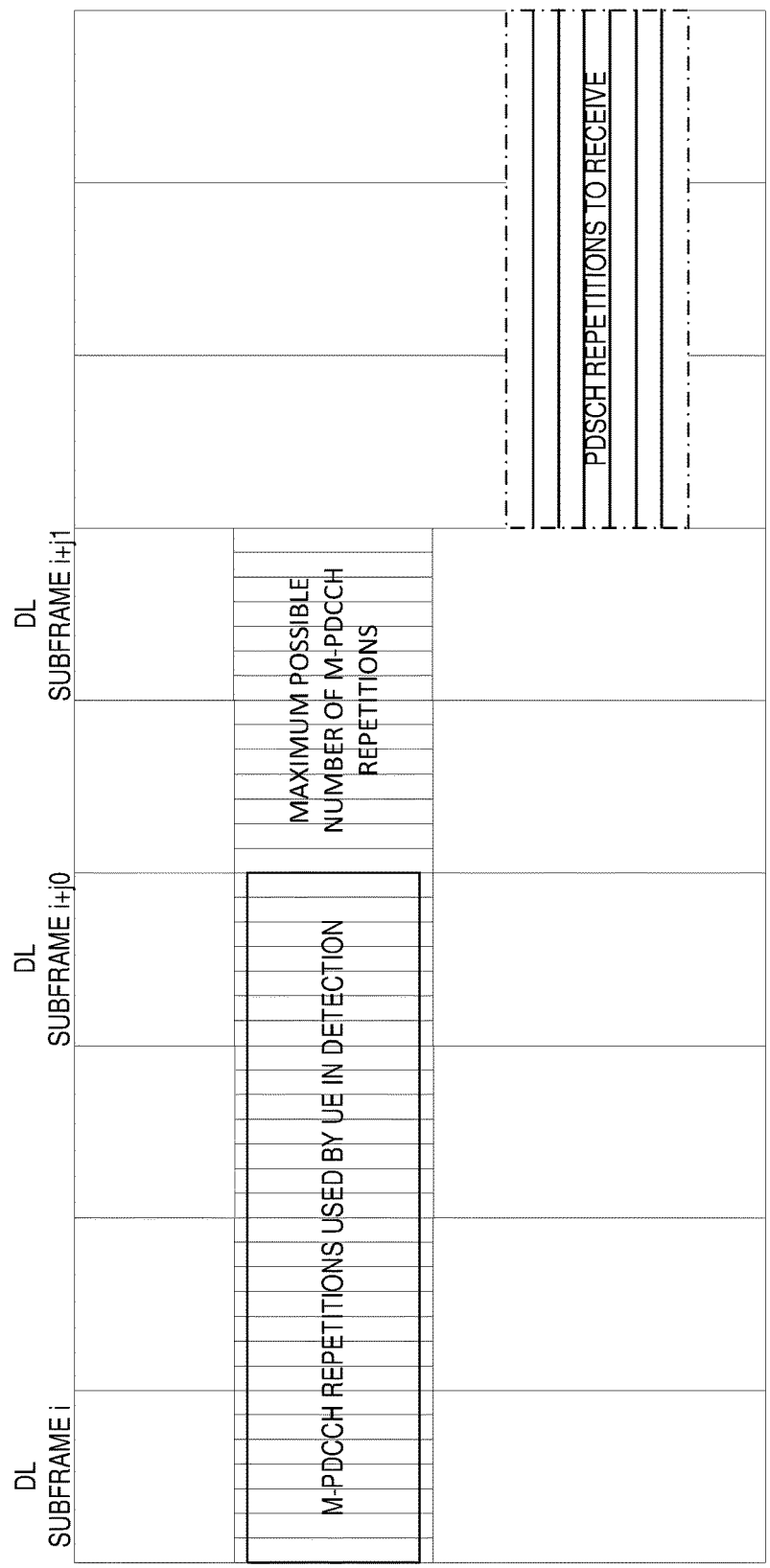
FIG. 7 is a schematic diagram of a frame structure showing M-PDCCH repetitions.

Since the actual number of M-PDCCH repetitions may be different from the number of repetitions the UE 12 used in detection, accumulation of the PDSCH repetitions by the UE 12 may not start immediately after the last M-PDCCH repetition used in detection. Instead, accumulation of the PDSCH repetitions by the UE 12 needs to start at a known subframe. For example, if M-PDCCH repetition ends at subframe n when the maximum number of M-PDCCH repetitions is assumed for the given paging occasion, then PDSCH accumulation starts at subframe n+k. A typical example is k=1, i.e., PDSCH accumulation starts immediately after the maximum number of repetitions of M-PDCCH for the given level of coverage enhancement. This is illustrated with an example in FIG. 7. In FIG. 7, the starting subframe for M-PDCCH of the given paging occasion is subframe i. When the maximum possible number of M-PDCCH repetitions is assumed, M-PDCCH repetition ends at subframe (i+j1). In this example, the UE 12 is able to successfully detect the M-PDCCH after accumulating (j0+1) repetitions of M-PDCCH, ending the M-PDCCH accumulation at subframe (HO). The UE 12 can switch off receiving the downlink signal from subframe (i+j0+1) to subframe (i+j1). The UE 12 switches on downlink reception at subframe (i+j1+1), where PDSCH reception starts. The repetition level for the PDSCH is signalled in the Downlink Control Information ( )DCI on the M-PDCCH in addition to, for example, the Physical Resource Block (PRB) group and the Transport Block Size (TBS).

Radio access network requirements (e.g., RAN4 requirements in 3GPP) may need to be developed in order to ensure sufficient paging performance. For example, the accuracy level of SINR estimation is defined, in some embodiments, to ensure minimum requirement of UE performance in receiving M-PDCCH associated with PDSCH.

Figure 8:
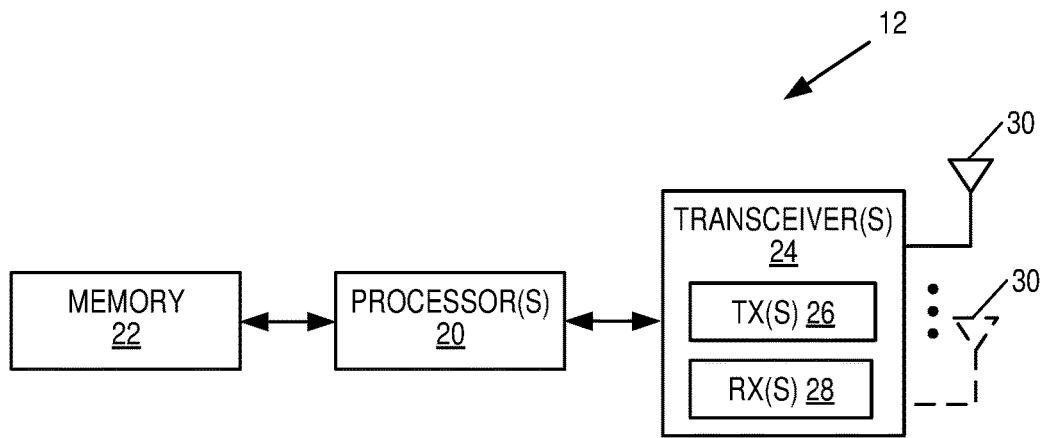
FIGS. 8 and 9 are block diagrams of example embodiments of a UE according to some embodiments of the present disclosure.
Figure 9:
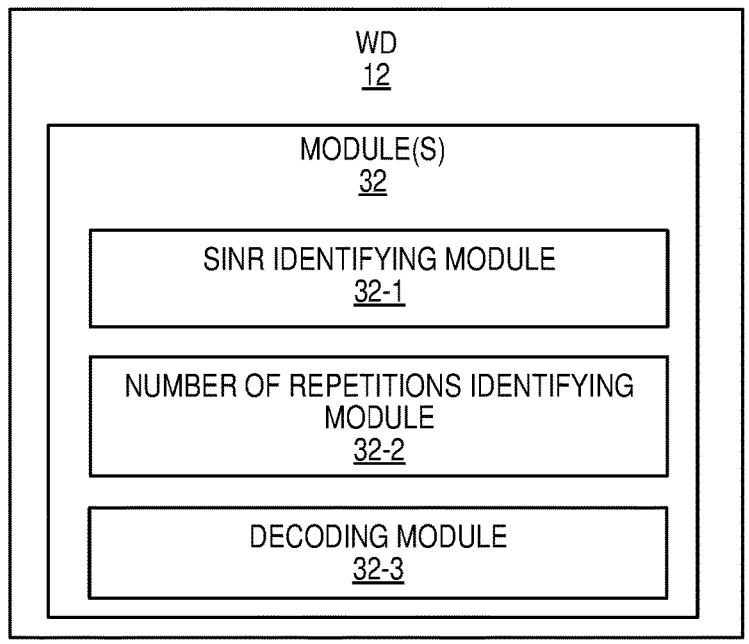

Although the wireless communication devices 12 (e.g., UEs 12) may represent communication devices that include any suitable combination of hardware and/or software, these wireless communication devices 12 may, in particular embodiments, represent devices such as the example wireless communication device 12 illustrated in greater detail by FIGS. 8 and 9. Similarly, although the illustrated radio access nodes 14 (e.g., base stations or eNBs 14) may represent network nodes that include any suitable combination of hardware and/or software, these nodes may, in particular embodiments, represent devices such as the example radio access node 14 illustrated in greater detail by FIGS. 10 to 12.

As shown in FIG. 8, the example wireless communication device 12 (e.g., UE) includes a processor(s) 20 (e.g., Central Processing Unit(s) (CPU(s)), Application Specific Integrated Circuit(s) (ASIC(s)), Field Programmable Gate Array(s) (FPGA(s)), or the like, or any combination thereof), memory 22, a transceiver(s) 24 including a transmitter(s) 26 and a receiver(s) 28 coupled to an antenna(s) 30. In particular embodiments, some or all of the functionality described above as being provided by UEs, MTC, or M2M devices, and/or any other types of wireless communication devices may be provided by the processor(s) 20 executing instructions stored on a computer-readable medium, such as the memory 22 shown in FIG. 8. Alternative embodiments of the wireless communication device 12 may include additional components beyond those shown in FIG. 8 that may be responsible for providing certain aspects of the device's functionality, including any of the functionality described above and/or any functionality necessary to support the solution described above.

In some embodiments, a computer program including instructions which, when executed by at least one processor, causes the at least one processor to carry out the functionality of the wireless communications device 12 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 9 is a schematic block diagram of the wireless communication device 12 according to some other embodiments of the present disclosure. The wireless communication device 12 includes one or more modules 32, each of which is implemented in software. The module(s) 32 provide the functionality of the wireless communication device 12 described herein. In this example, the wireless communication device 12 includes a SINR identifying module 32-1 that operates to identify a SINR for the downlink from the base station 14 to the wireless communication device 12 as described above, a number of repetitions identifying module 32-2 that operates to identify the number of repetitions (expected) for M-PDCCH based on the identified SINR as described above, and a decoding module 32-3 that operates to attempt to decode M-PDCCH based on the identified number of repetitions as described above. Note, however, that the wireless communication device 12 may include additional or alternative module(s) 32 that provide or enable the functionality of the wireless communication device 12 described herein.

Figure 10:
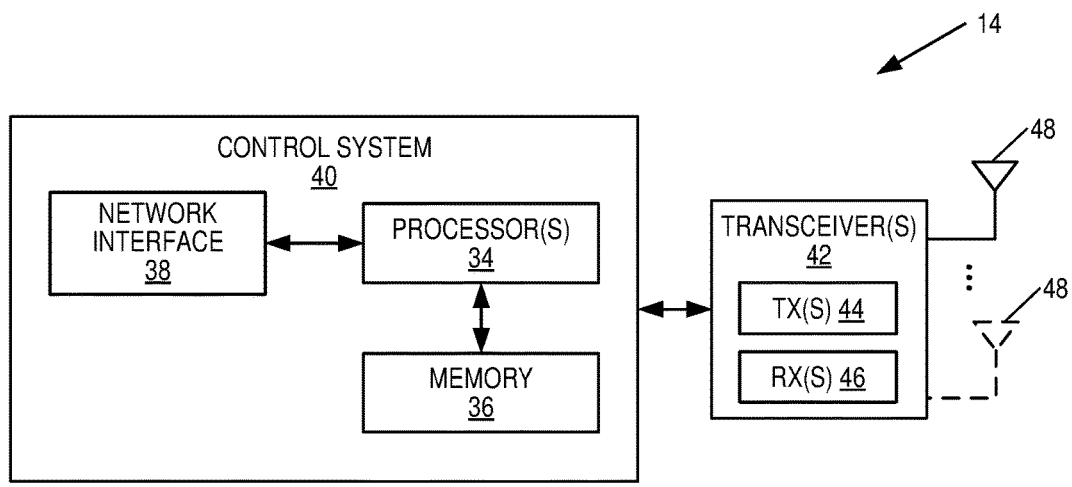
FIGS. 10 to 12 are block diagrams of example embodiments of a radio access node according to some embodiments of the present disclosure.

As shown in FIG. 10, the example radio access node 14 includes a processor(s) 34 (e.g., CPU(s), ASIC(s), FPGA(s), or the like, or any combination thereof), memory 36, and a network interface 38 embodied in, in this example, a control system 40. The radio access node 14 further includes a transceiver(s) 42 that includes a transmitter(s) 44 and a receiver(s) 46 coupled to an antenna(s) 48. In some embodiments, the transceiver(s) 42 is external to the control system 40 and connected to the control system 40 via, e.g., a wired connection (e.g., an optical cable). However, in some other embodiments, the transceiver(s) 42 and potentially the antenna(s) 48 are integrated together with the control system 40. In particular embodiments, some or all of the functionality described above as being provided by a base station, a node B, an eNB, and/or any other type of network node may be provided by the processor(s) 34 executing instructions stored on a computer-readable medium, such as the memory 36 shown in FIG. 10. Alternative embodiments of the radio access node 14 may include additional components responsible for providing additional functionality, including any of the functionality identified above and/or any functionality necessary to support the solution described above.

Figure 11:
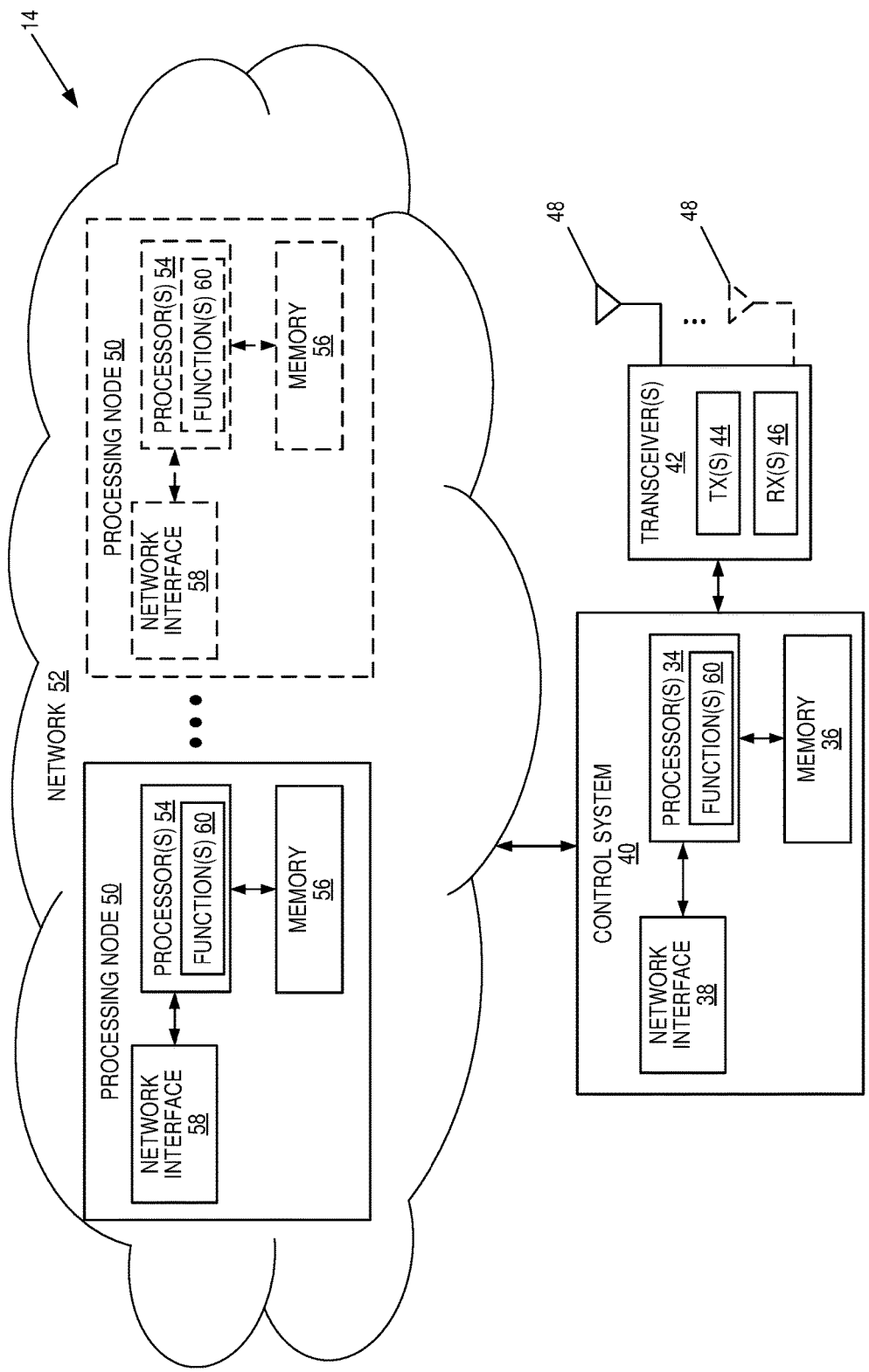

FIG. 11 is a schematic block diagram that illustrates a virtualized embodiment of the radio access node 14 according to some embodiments of the present disclosure. This discussion is equally applicable to other types of network nodes. Further, other types of network nodes may have similar virtualized architectures.

As used herein, a "virtualized" radio access node is an implementation of the radio access node 14 in which at least a portion of the functionality of the radio access node 14 is implemented as a virtual component(s) (e.g., via a virtual machine(s) executing on a physical processing node(s) in a network(s)). As illustrated, in this example, the radio access node 14 includes the control system 40 that includes the one or more processors 34 (e.g., CPUs, ASICs, FPGAs, and/or the like), the memory 36, and the network interface 38 and the one or more transceivers 42 that each includes the one or more transmitters 44 and the one or more receivers 46 coupled to the one or more antennas 48, as described above. The control system 40 is connected to the transceiver(s) 42 via, for example, an optical cable or the like. The control system 40 is connected to one or more processing nodes 50 coupled to or included as part of a network(s) 52 via the network interface 38. Each processing node 50 includes one or more processors 54 (e.g., CPUs, ASICs, FPGAs, and/or the like), memory 56, and a network interface 58.

In this example, functions 60 of the radio access node 14 described herein are implemented at the one or more processing nodes 50 or distributed across the control system 40 and the one or more processing nodes 50 in any desired manner. In some particular embodiments, some or all of the functions 60 of the radio access node 14 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 40 is used in order to carry out at least some of the desired functions 60. Notably, in some embodiments, the control system 40 may not be included, in which case the transceiver(s) 42 communicate directly with the processing node(s) 50 via an appropriate network interface(s).

In some embodiments, a computer program including instructions which, when executed by at least one processor, causes the at least one processor to carry out the functionality of radio access node 14 or a node (e.g., a processing node 50) implementing one or more of the functions 60 of the radio access node 14 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
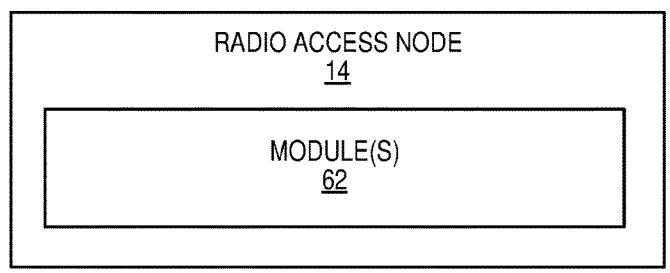

FIG. 12 is a schematic block diagram of the radio access node 24 according to some other embodiments of the present disclosure. The radio access node 14 includes one or more modules 62, each of which is implemented in software. The module(s) 62 provide the functionality of the radio access node 14 described herein. This discussion is equally applicable to the processing node 50 of FIG. 14 where the modules 62 may be implemented at one of the processing nodes 50 or distributed across multiple processing nodes 50 and/or distributed across the processing node(s) 50 and the control system 40.

The following acronyms are used throughout this disclosure.

3GPP Third Generation Partnership Project
5G Fifth Generation
ASIC Application Specific Integrated Circuit
AWGN Additive White Gaussian Noise
CPU Central Processing Unit
DCI Downlink Control Information
DFT Discrete Fourier Transform
eNB Enhanced or Evolved Node B
E-PDCCH Enhanced Physical Downlink Control Channel
FPGA Field Programmable Gate Array
HARQ Hybrid Automatic Repeat Request
IoT Internet of Things
LTE Long Term Evolution LUT Look-Up Table
M2M Machine-to-Machine
MBMS Multimedia Broadcast/Multicast Services
MHz Megahertz
MME Mobility Management Entity
MTC Machine Type Communication
OFDM Orthogonal Frequency Division Multiplexing
PDCCH Physical Downlink Control Channel
PDN Packet Data Network
PDCCH Physical Downlink Shared Channel
P-GW Packet Data Network Gateway
PRACH Physical Random Access Channel
PRB Physical Resource Block
PUSCH Physical Uplink Shared Channel
RAT Radio Access Technology
Rel Release
RRC Radio Resource Control
RSRQ Reference Signal Received Quality
SCEF Service Capability Exposure Function
SINR Signal to Interference plus Noise Ratio
TBS Transport Block Size
TDD Time Division Duplexing
TTI Transmission Time Interval
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a User Equipment, UE, in a cellular communications network, comprising:
   identifying a Signal to Interference plus Noise, SINR, value for a signal received by the UE from a radio access node of the cellular communications network;
   identifying a number of repetitions estimated to be used for transmission of a downlink channel from the radio access node based on the SINR value; and
   attempting to decode the downlink channel based on the number of repetitions estimated to be used for transmission of the downlink channel from the radio access node.

2. The method of claim 1 wherein the downlink channel is a physical downlink control channel.

3. The method of claim 1 wherein the UE is a low-complexity UE that receives a limited system bandwidth within a larger system bandwidth of the radio access node, and the downlink channel is a physical downlink control channel for low-complexity UEs.

4. The method of claim 3 wherein the limited system bandwidth is 1.4 megahertz, MHz.

5. The method of claim 3 wherein the physical downlink control channel is a physical downlink control channel utilized to page the UE.

6. The method of claim 1 wherein identifying the number of repetitions estimated to be used for transmission of the downlink channel from the radio access node comprises identifying the number of repetitions estimated to be used for transmission of the downlink channel from the radio access node based on a predefined Look-Up Table, LUT.

7. The method of claim 6 wherein the predefined LUT maps Additive White Gaussian Noise, AWGN, SINR values to repetition number values.

8. The method of claim 1 wherein identifying the number of repetitions estimated to be used for transmission of the downlink channel from the radio access node comprises identifying the number of repetitions estimated to be used for transmission of the downlink channel from the radio access node based on a predefined equation.

9. The method of claim 1 wherein the number of repetitions estimated to be used for transmission of the downlink channel from the radio access node may be different than a number of repetitions utilized by the radio access node when transmitting the downlink channel.

10. The method of claim 1 wherein attempting to decode the downlink channel based on the number of repetitions estimated to be used for transmission of the downlink channel from the radio access node comprises:
    accumulating a number of subframes that corresponds to the number of repetitions when attempting to decode the downlink channel.

11. The method of claim 1 wherein attempting to decode the downlink channel based on the number of repetitions estimated to be used for transmission of the downlink channel from the radio access node comprises:
    accumulating a first number of subframes that corresponds to a first hypothesized number of repetitions in a set of hypothesized numbers of repetitions, the set comprising the number of repetitions estimated to be used for transmission of the downlink channel from the radio access node;
    attempting to decode the downlink channel based on the accumulation of the first number of subframes; and
    if the attempt to decode the downlink channel based on the accumulation of the first number of subframes is unsuccessful:
      accumulating an additional number of subframes together with the first number of subframes to provide accumulation of a second number of subframes that corresponds to a second hypothesized number of repetitions in the set of hypothesized numbers of repetitions; and
      attempting to decode the downlink channel based on the accumulation of the second number of subframes.

12. The method of claim 11 further comprising:
    stopping accumulation of subframes and deactivating a respective receiver of the UE upon successfully decoding the downlink channel or upon attempting to decode the downlink channel based on an accumulation of a number of subframes that corresponds to a final number of hypothesized repetitions in the set of hypothesized numbers of repetitions.

13. A User Equipment, UE, for a cellular communications network, comprising:
    at least one transceiver;
    at least one processor; and
    a memory storing instructions executable by the at least one processor whereby the UE is configured to:
      identify a Signal to Interference plus Noise, SINR, value for a signal received by the UE from a radio access node of the cellular communications network;
      identify a number of repetitions estimated to be used for transmission of a downlink channel from the radio access node based on the SINR value; and
      attempt to decode the downlink channel based on the number of repetitions estimated to be used for transmission of the downlink channel from the radio access node.

14. The UE of claim 13 wherein the downlink channel is a physical downlink control channel.

15. The UE of claim 13 wherein the UE is a low-complexity UE that receives a limited system bandwidth within a larger system bandwidth of the radio access node, and the downlink channel is a physical downlink control channel for low-complexity UEs.

16. The UE of claim 13 wherein, in order to identify the number of repetitions estimated to be used for transmission of the downlink channel from the radio access node, the UE is further configured to identify the number of repetitions estimated to be used for transmission of the downlink channel from the radio access node based on a predefined Look-Up Table, LUT.

17. The UE of claim 16 wherein the predefined LUT maps Additive White Gaussian Noise, AWGN, SINR values to repetition number values.

18. The UE of claim 13 wherein, in order to identify the number of repetitions estimated to be used for transmission of the downlink channel from the radio access node, the UE is further configured to identify the number of repetitions estimated to be used for transmission of the downlink channel from the radio access node based on a predefined equation.

19. The UE of claim 13 wherein the number of repetitions estimated to be used for transmission of the downlink channel from the radio access node may be different than a number of repetitions utilized by the radio access node when transmitting the downlink channel.

20. The UE of claim 13 wherein, in order to attempt to decode the downlink channel based on the number of repetitions estimated to be used for transmission of the downlink channel from the radio access node, the UE is further configured to:
  accumulate a number of subframes that corresponds to the number of repetitions when attempting to decode the downlink channel.

* * * * *